March 19, 1957     O. R. CARPENTER     2,785,459
METHOD OF MAKING FUSION WELD SEALED PRESSURE JOINT
Filed Aug. 14, 1951

INVENTOR
Otis R. Carpenter
BY
J P Moran
ATTORNEY

United States Patent Office 2,785,459
Patented Mar. 19, 1957

2,785,459

METHOD OF MAKING FUSION WELD SEALED PRESSURE JOINT

Otis R. Carpenter, Barberton, Ohio, assignor to The Babcock & Wilcox Company, Rockleigh, N. J., a corporation of New Jersey Application August 14, 1951, Serial No. 241,747

4 Claims. (Cl. 29—470.5)

This invention relates to pressure-tight tube and tube seat connections between a tube and the wall of a pressure part and, more particularly, to a novel fusion weld sealed pressure joint and a method of making the same.

In commercial practice, tubes are connected to the walls of pressure parts, such as drums, headers, tube sheets and the like, by drilling or otherwise forming tube seats through the wall, inserting the tube ends into the tube seats, and then expanding the tube ends into interlocking engagement with the tube seats. While this provides a mechanically satisfactory tube and tube seat connection, it is difficult to make the connections pressure-tight for satisfactory service under relatively high pressures. This is particularly true when connecting relatively thick-walled tubes into seats due to the difficulties of mechanically displacing such thicknesses of metal.

For this reason, a seal weld is sometimes formed between the tube end and the inner surface of the wall. This seal weld forms a pressure-tight seal between the tube end and the wall, cooperating with the expanded tube-into-tube-seat connection to provide a completely pressure-tight and mechanically satisfactory connection.

However, when a seal weld is thus made, the base metal of the tube end of the pressure part immediately adjacent the weld is heated to temperatures varying from the melting point of the metal at the line of fusion of the weld to successively lower temperatures at progressively increasing distances from the line of fusion. Carbon and low alloy steels, as well as plain carbon steels, when heated to or above a temperature generally referred to as the lower critical temperature, experience a hardening upon rapid cooling from the lower critical temperature. This lower critical temperature is a function of the analysis of the steel.

This hardening of the base metal frequently results in cracking thereof under service conditions involving, for example, relatively high pressures. Such hardening may be reduced or eliminated by stress relieving the parts after the welding is completed. However, the joint between a tube and a tube seat of a pressure part is usually made during field erection of the parts. In the case of relatively massive components, such as pressure drums, stress relieving after seal welding is either not feasible or so difficult as to be impractical.

The present invention relates to a novel fusion weld sealed pressure joint effected without hardening of the base metal during the seal welding. To this end, a deposit of metal, whose hardness is substantially unaffected by heating due to fusion welding, is placed on the inner surface of the wall of the pressure part to which the tube is to be connected, and around and including the periphery of the tube seat location. After the tube has been expanded into the tube seat, the seal weld is made between the end of the tube and such deposit. The deposit has a width and depth sufficient that the temperature gradient through the deposit and the base metal will be such that the base metal will not have its temperature raised above the lower critical temperature.

For an understanding of the invention principles, reference is made to the following detailed description of typical embodiments of the invention methods as illustrated in the accompanying drawings.

Figures 1, 2:
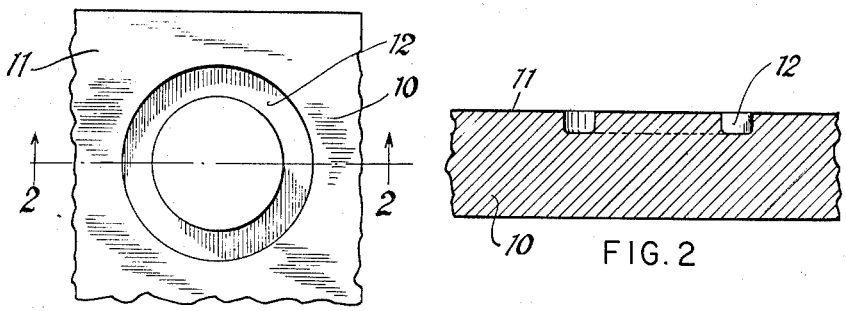
Fig. 1 is a plan view of the inner surface of the wall of a pressure part illustrating the first step in the invention method.
Fig. 2 is a diametric sectional view on the line 2—2 of Fig. 1.
Figure 3:
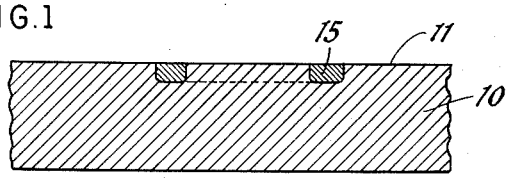
Figs. 3, 4 and 5 are diametric sectional views illustrating successive steps in the invention method.
Figure 4:
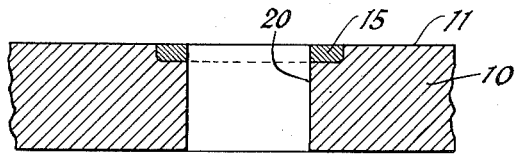
Figure 5:
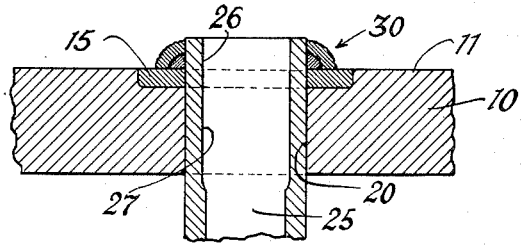

While the invention is of general applicability to any tube and tube seat connection including a seal weld, it is more particularly applicable to connecting tubes to relatively thick-walled pressure parts, such as drums of a vapor generator. To withstand the relatively high pressures involved in modern vapor generator installations, these drums are formed of relatively thick plate, and are frequently of an alloy steel. These factors, the wall thickness and the composition of the metal, accentuate the problems encountered due to the localized high heating involved in making the seal weld.

The several figures of the drawings may be taken to indicate a small section of the wall of a pressure vessel such as, for example, a steam and water drum of a vapor generator, the sections taken being relatively so small that the curvature is of such a nature as not to be readily portrayable in the drawing figures. Also, the drawings illustrate a preferred embodiment of the method involving the initial formation of an annular groove in the inner surface of the pressure part wall concentric with the desired tube seat location, the filling of this groove with a weld deposit of metal whose hardness is substantially unaffected by temperature increases during fusion welding, the stress relieving of the weld and its deposit, and the subsequent formation, by drilling or the like, of the tube seat through the weld. It should be understood, however, that the invention may be otherwise embodied within the scope of the inventive concept. For example, the tube seat may be formed first, after which a peripheral groove is formed around its inner edge and filled with the weld deposit, the parts then being stress relieved. Alternatively, the weld deposit can be placed directly on the inner surface of the pressure part wall surrounding the tube seat location. Furthermore, the weld deposit need not necessarily be circular in configuration. For example, a rectangular recess may be milled or ground out in the weld inner surface substantially concentric with and including the desired tube seat location, this recess can be filled with the weld deposit, the tube seat can be formed through the deposit and the wall, and the parts may then be stress relieved.

A further important factor in the invention is that the preparation of the pressure part wall, and of the tube end in the case of relatively thick-walled tubes, is effected at the plant where the pressure part is fabricated, rather than at the installation location. Thus, the pressure part, such as a drum or header, can be relatively easily stress relieved inasmuch as it has not yet been joined with its component tubes and supporting structure as is the case in a field installation.

Referring to the drawings, a pressure part is indicated as including a wall 10 having an inner surface 11 which may be, for example, the interior surface of a pressure drum. In the preferred embodiment of the invention method, an annular groove 12 is formed in the surface 11 at the desired tube seat location and concentric therewith. Groove 12 has an inner diameter somewhat, or slightly, less than the diameter of the eventual tube seat. The outer diameter of groove 12 and the depth of the groove are selected in accordance with the analysis of the metal of wall 10 and the thickness of the wall in such manner that the weld deposit will have a breadth and depth such that the temperature gradient therethrough will be of such nature that no part of the metal of wall 10 is raised to a temperature above the lower critical temperature during the seal welding. This breadth and depth will vary with different analyses of metal of wall 10 and different thicknesses of the wall, the metal analyses determining the lower critical temperature and the wall thickness determining the temperature gradient through the wall.

The groove 12 is then welded with a weld deposit 15 of a metal whose hardness is substantially unaffected by the high temperatures resulting from fusion welding. A preferred metal is "Armco" iron which is a commercially pure iron produced with the specific purpose of excluding all alloying elements such as carbon, silicon, sulphur, phosphorous, and so forth, or reducing the percentages of such alloying elements to an extent where the elements will not be of any consequence insofar as the properties of the commercially pure iron are concerned. Although the iron is not chemically pure, the percentage of elements other than iron is so low that, for practical purposes, "Armco" can be considered pure iron. The advantage of this type of iron is that it is not heat treatable in the normal sense so that, when subjected to relatively rapid heating to high temperatures and relatively fast cooling, such as occurs during welding, the hardness of the iron is not affected in any way.

After groove 12 has been filled with weld deposit 15, tube seat 20 is formed concentric with the weld deposit in such a manner as to remove iron from the inner periphery of the deposit. The pressure part having wall 10 with deposit 15 in its inner surface 11 is then stress relieved in the usual manner to eliminate any hardening of the base metal due to the deposition of weld deposit 15. All of the tube seats in the pressure part are similarly formed before such stress relieving takes place.

In the field assembling of the installation of which the pressure part is to be a component, tubes such as 25 are inserted into tube seats 20. The inner ends of the tubes may project from surface 11 as indicated at 26, or may be substantially flush with surface 11. The tubes are then expanded into the tube seats in the usual manner as indicated at 27. A fusion weld 30 is then formed between the end 26 of the tube and the weld deposit 15, seal weld 30 preferably being a multiple layer weld. The composition of the weld 30 may vary over quite a substantial range of analyses, but in general the seal weld will comprise carbon steel, carbon molybdenum steel, or one of the low chromium steels such as "Croloy 2." Typical examples are given in the following table.

|    | Carbon Steel | Carbon Molybdenum | "Croloy 2" |
|----|------|------|------|
| C  | .08  | .08  | .07  |
| Mn | .40  | .40  | .40  |
| Si | .15  | .15  | .35  |
| Cr |      |      | 2.00 |
| Mo |      | .50  | .50  |

In some cases the seal weld may be made with a stainless steel electrode, such as a 25 Cr–20 Ni or 18 Cr–8 Ni alloy steel.

Due to the breadth and depth of weld deposit 15, as explained above, are carefully chosen with respect to the lower critical temperature of the metal of wall 10 and the thickness of the wall, the temperature gradient during the seal welding is such that none of the base metal of wall 10 is raised to a temperature above its lower critical temperature. Consequently, upon rapid cooling of the seal weld, there is no hardening of the metal of wall 10 and thus no possibility of successive cracking of the weld, due to such hardening, under the temperature and pressure stresses encountered in service.

Figure 6:
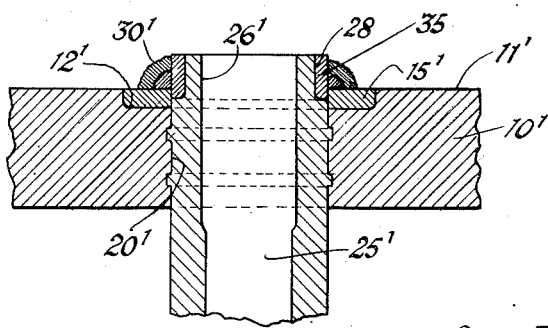
Fig. 6 is a diametric sectional view illustrating the invention method as employed in the seal welding of a relatively thick-walled tube to a relatively thick-walled pressure vessel.

Fig. 6 illustrates the application of the invention to the formation of a connection between a tube seat in a substantially thick wall 10' of a pressure part and a thick-walled tube 25' designed for high pressure operation. In this case, the groove 12' is formed in the inner surface 11' of wall 10' in the same manner as in Figs. 1 and 2 and filled with the weld deposit 15'. The end 26' of tube 25' has a circumferential groove 28 formed therearound and filled with a weld deposit 35 of preferably the same analyses as that of deposit 15', the principle requirement being that the metal of deposit 35 be of such a nature that its hardness is unaffected by the rapid high heating and rapid cooling during fusion welding. The width and depth of deposit 35 are so selected, with respect to the analyses of the metal of tube 25' and the thickness of the tube wall, that the temperature gradient during the seal welding will be such that the base metal of tube 25' is not raised above the lower critical temperature. Following the formation of weld deposit 35, at least the inner end of tube 25' is stress relieved.

In assembling tube 25' to tube seat 20', the tube is expanded into the tube seat in the usual manner, a grooved type of tube seat being shown for purposes of illustrating the different types of tube seats to which the invention is applicable. After tube 25' has been expanded into tube seat 20' a seal weld 30' is deposited between deposits 15' and 35 to seal the tube end to wall 10'.

While specific embodiments of the invention have been shown and described in detail to illustrate the application of the invention principles, it will be understood that the invention may be otherwise embodied without departing from such principles.

I claim:

1. A method of forming a pressure tight tube and tube seat connection between a tube and the wall of a pressure part whose hardness is increased by heating above its lower critical temperature followed by cooling, the wall thickness of the tube and pressure part being of a magnitude such as to preclude formation of a pressure tight connection by mechanical expansion of the tube into a tube seat through the pressure part wall; such method comprising forming in the inner surface of the wall an annular groove substantially concentric with the desired tube seat position; the annular groove having an inner diameter less than the outside diameter of the tube and an outside diameter greater than the outside diameter of the tube; filling such groove with a weld deposit of metal whose hardness is unaffected by such heating and cooling; forming the tube seat through the wall concentric with such annular deposit, such forming removing metal from the inner periphery of the weld deposit; thereafter stress relieving the pressure part at least adjacent said tube seat; inserting the tube end through the tube seat to at least the inner surface of such wall; expanding the tube against the inner periphery of the tube seat; and thereafter fusion seal welding the outer peripheral surface of the tube end to such metal deposit.

2. A method of forming a pressure tight tube and tube seat connection between a tube and the wall of a pressure part whose hardness is increased by heating above its lower critical temperature followed by cooling, the wall thickness of the tube and pressure part being of a magnitude such as to preclude formation of a pressure tight connection by mechanical expansion of the tube into a tube seat through the pressure part wall; such method comprising forming in the inner surface of the wall an annular groove substantially concentric with the desired tube seat position, the annular groove having an inner diameter less than the outside diameter of the tube and an outside diameter greater than the outside diameter of the tube; filling such groove with a weld deposit of commercially pure iron; forming the tube seat through the wall concentric with such annular deposit, such forming removing metal from the inner periphery of the weld deposit; thereafter stress relieving the pressure part at least adjacent said tube seat; inserting the tube end through the tube seat to at least the inner surface of such wall; expanding the tube against the inner periphery of the tube seat; and thereafter fusion seal welding the outer peripheral surface of the tube end to such iron deposit.

3. A method of forming a pressure tight tube and tube seat connection between a tube and the wall of a pressure part whose hardness is increased by heating above its lower critical temperature followed by cooling, the wall thickness of the tube and pressure part being of a magnitude such as to preclude formation of a pressure tight connection by mechanical expansion of the tube into a tube seat through the pressure part wall; such method comprising forming in the inner surface of the wall an annular groove substantially concentric with the desired tube seat position, the annular groove having an inner diameter less than the outside diameter of the tube and an outside diameter greater than the outside diameter of the tube; filling such groove with a deposit of commercially pure iron; forming the tube seat through the wall concentric with such annular deposit, such forming removing metal from the inner periphery of the weld deposit; thereafter stress relieving the pressure part at least adjacent said tube seat; inserting the tube end through the tube seat to at least the inner surface of such wall; expanding the tube against the inner periphery of the tube seat; and thereafter fusion seal welding the outer peripheral surface of the tube end to such iron deposit; the outer diameter and the depth of such deposit having values such that the temperature gradient through the deposit as a result of such seal welding will result in a temperature of said wall less than the critical temperature of the material of the wall.

4. A method of forming a pressure tight tube and tube seat connection between a tube whose hardness is increased by heating above its lower critical temperature followed by cooling and the wall of a pressure part whose hardness is increased by heating above its lower critical temperature followed by cooling, the wall thickness of the tube and pressure part being of a magnitude such as to preclude formation of a pressure tight connection by mechanical expansion of the tube into a tube seat through the pressure part wall; such method comprising forming in the inner surface of the wall an annular groove substantially concentric with the desired tube seat position, the annular groove having an inner diameter less than the outside diameter of the tube; filling such groove with a weld deposit of commercially pure iron; forming the tube seat through the wall concentric with such annular deposit, such forming removing metal from the inner periphery of the weld deposit; thereafter stress relieving the wall; forming a circumferential groove in the outer surface of the tube adjacent an end thereof; filling such circumferential groove with a weld deposit of commercially pure iron; thereafter stress relieving at least such end of the tube; inserting such tube end through the tube seat to at least the inner surface of such wall; expanding the tube against the inner periphery of the tube seat; and thereafter forming a seal weld uniting the two weld deposits.

References Cited in the file of this patent
UNITED STATES PATENTS

| | | |
|---|---|---|
| 1,959,791 | Kautz | May 22, 1934 |
| 2,137,097 | Sateren | Nov. 15, 1938 |
| 2,216,033 | Hopkins | Sept. 24, 1940 |
| 2,232,656 | Davis | Feb. 18, 1941 |
| 2,233,455 | Larson | Mar. 4, 1941 |
| 2,710,443 | Webb | June 14, 1955 |